US006282373B1

(12) United States Patent
Glogovsky et al.

(10) Patent No.: US 6,282,373 B1
(45) Date of Patent: Aug. 28, 2001

(54) SYSTEM AND METHOD FOR IDENTIFYING FILM ROLLS DURING DEVELOPMENT PROCESSING

(75) Inventors: Terence M. Glogovsky, Sugar Hill; Desmond A. Martin, Duluth, both of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/604,494

(22) Filed: Jun. 27, 2000

(51) Int. Cl.[7] ............................ G03B 15/00; G03B 13/00

(52) U.S. Cl. .............................. 396/2; 396/564; 396/567; 355/27; 355/40; 355/41; 358/422; 358/487; 235/385

(58) Field of Search .................................... 396/567, 564, 396/578, 2; 355/40, 41, 27–29, 77; 705/8; 358/422, 487; 235/381, 384, 385

(56) References Cited

U.S. PATENT DOCUMENTS 5,025,140 * 6/1991 Varley .................................. 235/385
5,666,215 * 9/1997 Fredlund et al. .................... 358/487
5,760,917 * 6/1998 Sheridan .............................. 358/422
5,974,393 * 10/1999 McCullough et al. ................... 705/8

FOREIGN PATENT DOCUMENTS

234833 * 9/1987 (EP) ............................ 396/FOR 942

* cited by examiner

*Primary Examiner*—D Rutledge
(74) *Attorney, Agent, or Firm*—Maginot, Addison & Moore

(57) ABSTRACT

The system and method provide bin identification numbers for storage of developed film rolls in a system that provides reliable and effective notification to customers that film rolls they deposited with a vendor for processing are available for retrieval. The method determines whether the generated number is contained in a list of reserved bin numbers. If it is, another number is generated from the received data. This process continues until a generated number is generated that is not on the list of reserved bin numbers. That number is then added to the list and also stored in a data record corresponding to the received data. Upon retrieval of the developed film from the bin having the assigned bin number, the bin number is removed from the reserved list.

13 Claims, 4 Drawing Sheets

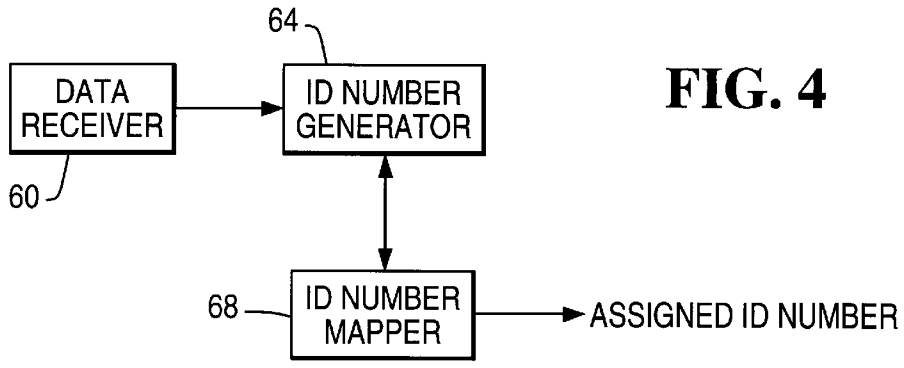
FIG. 4
FIG. 5
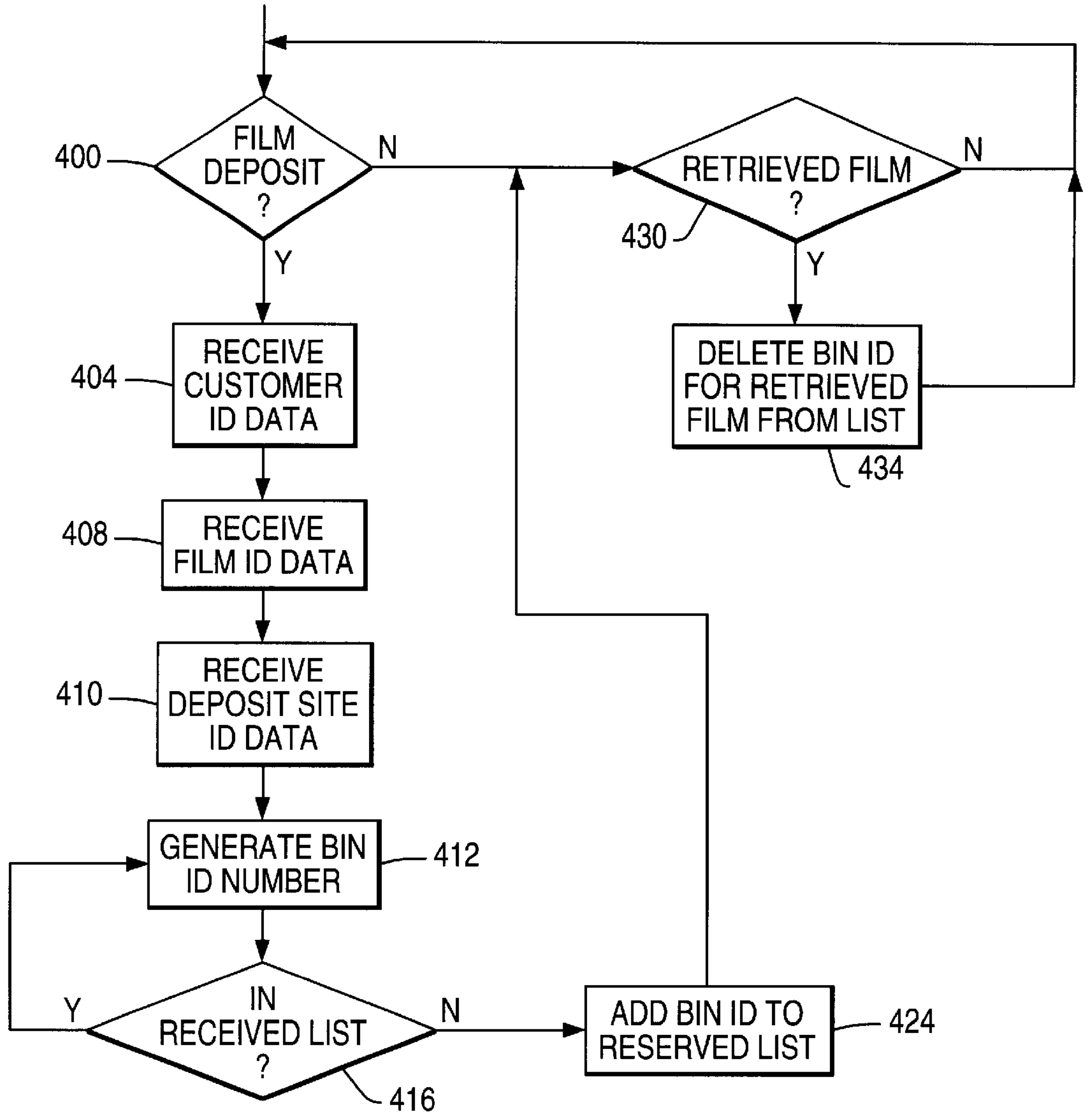

SYSTEM AND METHOD FOR IDENTIFYING FILM ROLLS DURING DEVELOPMENT PROCESSING

Cross Reference

Cross reference is made to copending U.S. patent applications Ser. No. 09/604,493 entitled "System and Method for Notifying Customers of Film Development" by Terence M. Glogovsky and Ser. No. 09/604,495, now U.S. Pat. No. 6,203,213 entitled "System and Method for Notifying Itinerants of Film Develoment" by Terence M. Glogovsky, both of which are assigned to the same assignee as the present invention, and both of which are filed concurrently herewith.

FIELD OF THE INVENTION

This invention relates generally to methods and systems for tracking items entrusted to an establishment for service or repair and, more particularly, to methods and systems for tracking film entrusted to an establishment for development.

BACKGROUND OF THE INVENTION

Many casual photographers use camera film that they have developed by commercial vendors. These vendors typically have the customers write data onto an envelope in which their photographs and negatives are returned. A record of the deposit is filed at the deposit site under the customer's last name. The film roll container is then placed in the envelope and sent to a photo processing lab. At the lab, the film roll is developed and the negatives and developed photographs are sealed in the envelope from which the film was retrieved. The envelope is then returned to the vendor's location where the customer deposited the film roll container, which is typically a retail store. There the envelope containing the developed film is placed in a bin or file marked with the customer's last name.

When a customer deposits the film roll container, a sign usually informs the customer that film deposited on that day is returned to that location on a particular date. The customer then knows to return to the store on or after that date to pick up the developed film and photographs. This method puts the onus on the customer to check with the store and see if the film has been returned from the processing lab. Customer frustration arises whenever the customer returns after the designated date for the developed photographs and the envelope with the developed film is not available. A variety of reasons exist for this problem. For one, the photo processing lab may have been inundated with significant number of film containers and delays in processing occur from the unanticipated volume. For example, holidays and graduations cause people to take many photographs and submit their film for development. Customers are informed by the personnel at the deposit location that they are unaware of the cause of the delay at the processing lab and that the customer must call or return to the deposit location at a later time for the processed film. Other reasons for film processing delays include development equipment failure and errors in handling film rolls during processing.

Another customer problem may occur when a customer deposits more than one film container. Each film container requires a separate envelope. Handling of the envelope, either during shipment or processing, by various personnel may cause envelopes containing film containers deposited at the same time to be separated. Consequently, the film may be processed at different times and returned to the location where they were deposited at different times. Again, the customer must check with the deposit location until all of the envelopes are returned. If the customer wants to view some of the photographs before all of them are returned, multiple trips must be made to the deposit location. Frustration with multiple trips or telephone calls to determine when a customer may retrieve developed photos may cause a customer to shop and have film developed at a business other than the deposit location.

One way of addressing these problems would be to notify customers directly when envelopes containing their developed film have been received at the location where the film was deposited. Such service would require someone to inventory the received envelopes each day. Then the person would need to call each person identified on the envelope to inform them of the arrival of the envelope. If the customer's phone was busy or the customer did not have an answering machine, the person at the deposit location may expend a significant amount of time on the notification tasks rather than tasks that might contribute more directly to the profitability of the business. Consequently, the overhead costs associated with such service are usually deemed too cost prohibitive for implementation of such service.

Another problem with the previously known systems for tracking film rolls while film is being processed is a file by last name method used to identify the bin for storing the records and the envelope containing the developed film. This method requires updating of labels to reflect customer names and may be time-consuming. Where records or envelopes are stored in bins that are marked by a few letters and arranged alphabetically, the bins may become quite full when a significant number of customers having similar last names deposit film rolls for development. Sorting through all of the records and envelopes in a bin to retrieve all of the envelopes for one particular customer may be a troublesome and inefficient process for a store employee.

What is needed is a way of identifying bins so a customer's records and envelopes are easily stored in a bin and retrieved from the bin.

SUMMARY OF THE INVENTION

The above-noted limitations of previously known methods for identifying a storage bin for developed film have been overcome by a system and method that operate in accordance with the principles of the present invention. The method of the present invention includes reading customer identification and film roll data for a customer depositing a film roll at a deposit site for development, and generating a bin identifier from the customer identification data, the film roll data, and deposit site identification data, and determining whether the generated number is within a reserved list of bin identification numbers. If the number is in the list, another number is generated and checked against the list. This continues until an unreserved number is located and assigned to the bin for the customer's developed film. The bin so identified may be used to store records and envelopes for the corresponding film roll only. When a customer receives a notification message that the developed film is available for retrieval at the deposit site, retrieval of the developed film for the customer is thereby facilitated.

The method may be implemented with a system made in accordance with the principles of the present invention. The system includes a data receiver for receiving customer identification data, film roll data, and deposit identification data, a bin identification number generator for generating a bin identifier, and an identification number mapper. The mapper is used to determine whether the generated number exists in a list of reserved bin numbers. The bin identifier generator may use the customer identification, film roll, and deposit site data with a hashing function to generate a bin number in an address space of bin numbers and then determine whether the number is currently reserved. Alternatively, the generator may select the next available bin number in the space of bin numbers. Preferably, the bin identifier is stored in a data record for the film roll that is stored in a database at the deposit site. By selecting a bin for any hard copy records generated at film roll deposit, the system of the present invention assigns a unique storage location for the developed film roll once it is returned. This makes locating the developed film easier for retrieval because the customer's name may be used to find the data record with the bin identifier. As only the customer's film is stored in the corresponding bin, the contents of the bin may be retrieved and given to the customer. A signal indicating the contents of the bin have been retrieved causes the bin identifier generator to reassign the bin number to the space of available bin numbers. In this manner, bin numbers may be used continuously without having to re-label the bins.

The bin identifier is preferably used in a system that notifies a customer when a developed film roll is available for retrieval. Such a system includes a data capture device for reading customer identification and film roll data, a data server for storing the data in a data repository, and a notification message generator for generating a notification message to the customer corresponding to the customer identification data. The data capture device may be a keypad or barcode reader at the film container deposit site. Data identifying the customer may be entered manually through the keypad by employees of the site or by a customer responding to questions displayed on a screen located near the keypad. When the data capture device is a barcode reader, a deposit site may issue customer tokens, such as plastic cards, that contain customer identification data encoded in a bar code or magnetic stripe affixed to the token. The data capture device may use the data read from the customer token to print a label having legible data and/or a bar code that identifies the customer, the film container, and the deposit site. This label may be applied to an envelope in which the film container is placed or it may be applied directly to the film container.

Once the film has been developed at a photo processing lab, the data may be read from the label and used by a server at the photo processing lab to generate status update messages. The status update messages may be electronic mail (email) messages that are sent to the server at the deposit site. Additionally, one or more of the status messages may be addressed to the user's email address as identified in the customer data read from the label. Alternatively, the server at the deposit site may send to the customer as notification messages one or more of the status messages received from the photo processing lab. Notification messages may also be voice mail messages that are delivered via an automated telemarketing system to the customer. The server at the deposit site may also obtain data from a data repository accompanying a developed film roll shipped to the deposit site to update its records regarding the status of the film container and then generate one or more notification messages to the customer. The notification message(s) may be delivered to a customer via email as voice mail. Once a customer receives the notification message via email or by phone, the customer may confidently return to the deposit site and retrieve the developed photographs.

It is an object of the present invention to uniquely identify a storage location for a customer's developed film so the developed film roll may be more easily retrieved.

It is an object of the present invention to allow storage bins for developed film rolls to be reused for other film rolls once a customer retrieves developed film.

These and other advantages and features of the present invention may be discerned from reviewing the accompanying drawings and the detailed description of the invention.

BRIEF DESCRIPTION OF THE DRAWINGS

The present invention may take form in various circuit and method components and arrangement of circuit and method components. The drawings are only for purposes of illustrating an exemplary embodiment and are not to be construed as limiting the invention.

FIG. 4 depicts a block diagram of a bin identifier system that may be used in the data server of FIG. 1; and FIG. 5 is a flowchart of an exemplary method for generating bin identifiers.

DETAILED DESCRIPTION OF THE INVENTION

Figure 1:
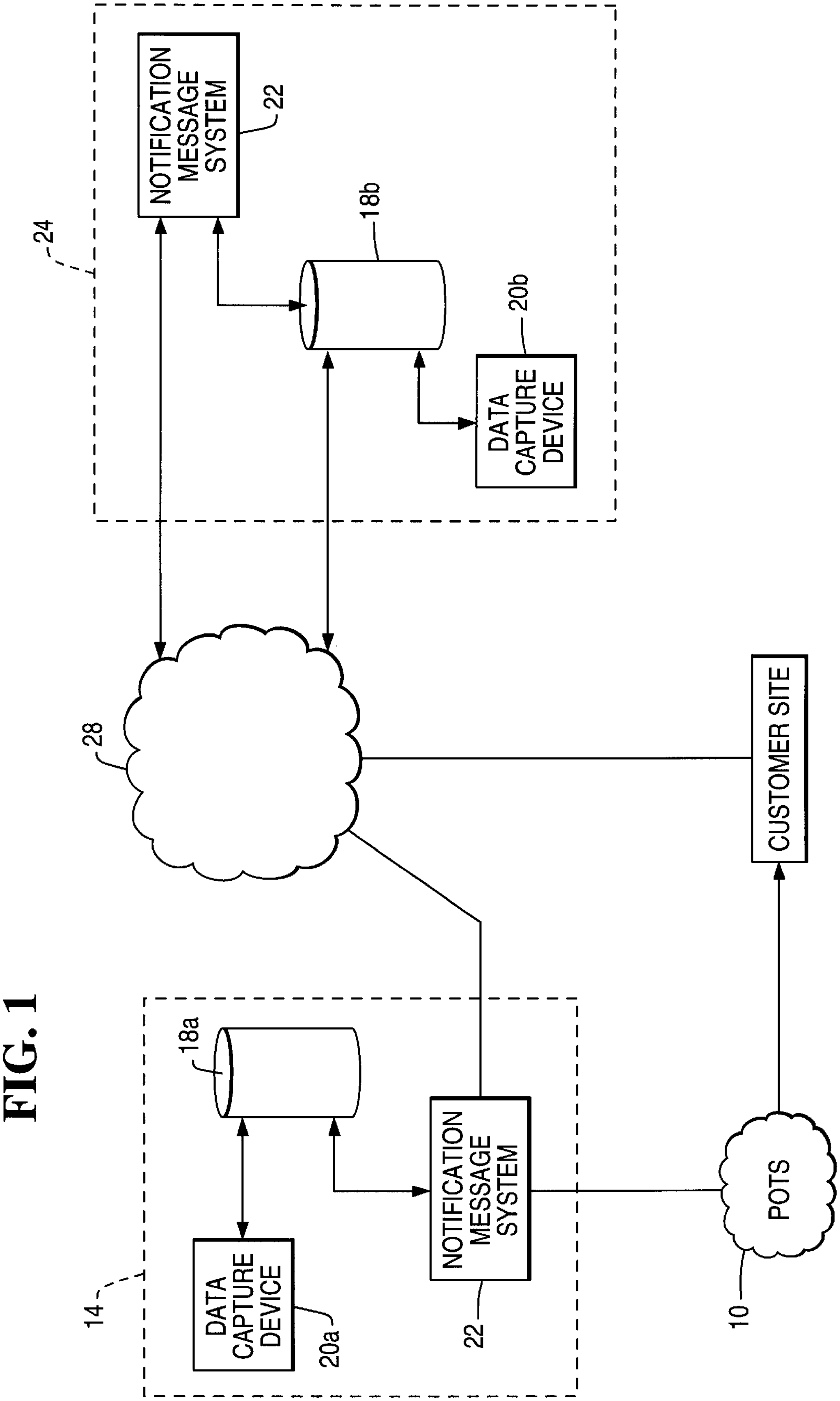
FIG. 1 depicts a block diagram of a system that may be used to notify a customer of a developed film roll being available for retrieval.

A system embodying the present invention is shown in FIG. 1. System 10 may include a deposit site 14, a lab site 24, and a customer site. Deposit site 14 includes a store server 18*a*, a data capture device 20*a*, and a notification message system 22 are located. Data capture device 20*a* is operatively coupled to server 18*a* and may be a barcode or magnetic stripe reader to read customer information stored on a customer token such as a plastic card having a magnetic stripe or barcode affixed thereto. Data capture device 20*a* may also be a keypad through which a customer or deposit site employee may enter customer and film roll data. Store server 18*a* uses customer data, film roll data, and deposit site data to generate a data repository that may accompany the film roll to a processing lab. Film roll data may be entered through a keypad or, if a bar code is affixed to the exterior of the film roll, a bar code reader may be used to read it. The deposit site data identifies the deposit site location and may be stored in server 18*a*. These various data correlate the customer, film roll container, and deposit site to one another. The data repository containing this data may be a label or bar code that may be applied using adhesive to the film roll container for tracking during its transfer to and from a photo processing lab. These data may also be used to generate a data record that is stored in server 18*a*, preferably in a database, for accounting purposes.

As discussed more fully below, notification message system 22 generates and sends to a customer a message informing the customer of the availability of the customer's developed film. Notification system 22 may be a separate email server, email software resident on server 18*a*, or an automated voice attendant system. When notification system 22 is an email server or software, the notification message is an email message sent to the customer's email address identified in the customer data. When notification system 22 is an automated voice attendant system, server 18*a* issues a command to system 22 to reserve a voicemail box on the system for a customer identified by customer data entered through capture device 20*a*. The customer is given the telephone number for accessing the voice attendant system and the code for interrogating the voicemail box reserved for the customer. The notification message is then stored in the reserved voicemail box and when the customer hears notification that the developed film is available, the customer may return to deposit site 14 to retrieve the film. Delivery of the developed film to the customer is communicated to server 18*a* so it may send a command to system 22 to delete the association between the customer and the reserved voicemail box. Alternatively, notification message system 22 may be an automated voice system such as those used by telemarketing firms that deliver a synthesized or recorded voice message to a telephone number.

Resident on server 18*a* is software that generates bin identifiers. This software includes a data receiver 60 (FIG. 4), an identification number generator 64, and an identification number mapper 68. Data acquisition function 60 either obtains the customer identification data and film roll data from data capture device 20*a* or, more preferably, it obtains them from server 18*a*. It also obtains the deposit site identification data from server 18*a*. These data are provided to identification number generator 64 that uses the data to generate a bin identifier number. Generator 64 may use a hashing function or the like to generate a number that is one of the numbers in the space of bin numbers. The space of bin numbers is comprised of all of the numbers that are used to identify storage bins for developed film rolls. The generated number is then provided to mapper 68 that compares the generated number to a list of reserved bin numbers. The reserved bin numbers are those numbers that have already been assigned as a storage location for a customer's developed film roll. If the generated number from generator 64 has already been assigned then a regenerate 70 signal is sent to generator 64. In response, generator 64 generates another number from the customer, film, and deposit site data. This cycle repeats until the generated number can be mapped to the space of available bin numbers. The selected number is added to the list of reserved bin numbers and mapper 68 sends the reserved bin number to server 18*a* for inclusion in the corresponding data record. Any hard copy records generated by server 18*a* may also be stored in the identified bin. When a customer has been notified and returns to deposit 14 to retrieve a developed film roll, data regarding the retrieval is passed to mapper 68. In response, mapper 68 deletes the corresponding bin number from the reserved list of bin numbers so the bin may be selected for storage of another customer's developed film.

An exemplary method for generating a bin number for storage of a customer's developed film roll is shown in FIG. 5. The process begins by detecting a film roll deposit (Block 400) and receiving the customer identification data (Block 404), the film identification data (Block 408), and the deposit site identification data (Block 410). These data are then used to generate a bin identification number (Block 412). This number is then compared to the list of reserved bin numbers (Block 416). If the bin identification number has already been assigned, another bin identification number is generated (Block 420). Once a bin identification number is generated that is not contained in the reserved list, it is stored in the reserved list (Block 424) and is passed to server 18*a* for inclusion in the corresponding data record. Generator 60 thereafter continues to monitor for new deposits or retrievals. Upon detection of a retrieval of a developed film roll (Block 430), the bin identification number for the retrieved film roll is deleted from the reserved list (Block 434). While the number generation may be performed using a hashing function and then checked to see if the generated number is currently reserved, a pointer may be kept that identifies the next available number in the space of bin identification numbers. The pointer method combines the generation and verification functions; however, it does not strongly correlate the three data types to the generated number as the hashing function does.

Using like numerals for like components, system 10 may also include a processing lab site 24 that may include a lab server 18*b* operatively coupled to a data capture device 20*b*. While lab server 18*b* and data capture device 20*b* may be identical to those at deposit site 14, they need not necessarily be the same. They should be capable of reading and processing data generated by one another if servers at each site are used to implement the present invention. In an embodiment of the present invention, servers 14*a* and 14*b* may be computer systems that use Pentium processors operating at 266 MHz, having 64 MB of RAM and a hard disk storage capacity of 4.3 GB. Servers 14*a* and 14*b* may use the Windows 95 or higher operating system or equivalent. Data capture device 20*a* and 20*b* may be a barcode reader such as a model 7890 barcode scanner manufactured by NCR of Duluth, Ga. or a keypad such as the keyboard of server 14*a* or 14*b* or a keypad such as model 5100 manufactured by NCR of Columbia, S.C. As discussed more fully below, lab site 24 may or may not include a notification message system 22 when a lab site 24 is used to implement the present invention.

At lab site 24, data capture device 20*b* reads the data repository accompanying a film roll container delivered to the site. This data may be stored in server 18*b*, preferably in a database, to track the status of the film roll processing at site 24. An alternative repository may be generated by server 18*b* to accompany the film roll during processing or the film roll container and its accompanying data repository may remain associated with the film during the film development process. Server 18*b* may also generate an electronic status message for transmission to server 18*a*. The communication of the status message may be made via a point-to-point communication path through a dial-up modem connection or it may be provided through an email service over a global computer communication network 28 such as the Internet. Server 18*a* may use status messages to update the status of the film container identified in the corresponding data record being maintained at server 18*a*.

After development of a roll of film, data capture device 20*b* may be used to read the data repository accompanying the developed film roll and update the status of the corresponding data record stored in server 18*b*. Again, server 18*b* may generate an electronic status message for communication to server 18*a* and server 18*a* may also update the status of the corresponding data record kept at server 18*a*. Server 18*b* may also use the customer data stored in the corresponding data record to send to the customer's email address via notification message system 22, a copy of the message sent to server 18*a*. This message informs the customer that the film roll deposited by the customer had been developed and may also include an estimated date for delivery of the developed film to deposit site 14 so the customer may plan for retrieval of the developed film. At shipment of the developed film roll, a data repository is associated with the developed film. This repository may be a portion of the original data repository generated by server 18*a*, such as a detachable segment, or another data repository generated by server 18*b*. Server 18*b* may again update its corresponding data record and send messages regarding shipment to server 18*a* and, if desired, through message system 22 to the customer as well.

Upon receipt of the developed roll at deposit site 14, data capture device 20*a* may be used to read the accompanying data repository and update its corresponding data record. Server 18*a* may then generate a message for transmission to server 18*b* indicating successful receipt of the developed film. In response, server 18*b* may delete the corresponding data record or archive the data for further auditing procedures. In accordance with the principles of the present invention, server 18*a* generates a notification message that indicates the developed film is ready for retrieval. This message is sent to notification message system 22 for delivery to the customer identified in the message generated from the customer data. The message may be an email message that is sent by a separate email server coupled to server 18*a* or by email software resident on server 18*a*. The notification email message is sent to the email address identified by the customer data stored in server 18*a*.

In another embodiment of the present invention, the notification message may be an audible message or a message that may be delivered audibly through an automated voice attendant system or telemarketing system. When notification message system 22 is an automated voice attendant system, the message is stored for access through a voicemail box previously reserved to the customer as noted above. The customer identification number may be used as a password for voicemail access. Using the telephone number of the voice attendant system, the reserved voicemail box number, and the customer identification number, the customer may access the voicemail box to ascertain whether the developed film is ready for retrieval at the deposit site. Upon retrieval, server 18*a* may be notified through data capture device 20*a* or other data entry method so server 18*a* may generate a command to notification system 22 to delete the association between a customer identification code and the reserved mail box. In this manner, mailboxes only remained assigned to a customer during the period in which the customer's film is being processed for development.

An automated telemarketing telephone system may also be used for system 22. Upon generation of the notification message, server 18*a* provides the message and a telephone number from the corresponding customer data to system 22. System 22 then calls the customer's telephone number and delivers the message to the person who answers or the answering machine attending the customer's telephone number. In this way, the customer may be notified of the availability of the developed film.

Regardless of the implementation of notification system 22 used in system 10, server 18*a* updates the corresponding data record maintained in its database to reflect the sending of a notification message to the customer identified by the record. Server 18*a* may periodically audit the data records stored in the database to determine whether a notified customer has not retrieved developed film delivered to deposit site 14. Upon detection of such an event, server 18*a* may generate another notification message to the customer and send it to system 22 for delivery to the customer. Preferably, the message informs the customer of the prior notification. After some reasonable number of notification messages have been sent, server 18*a* may generate a log of developed film rolls that have not been retrieved for review by a human operator. Upon retrieval of a developed roll by a customer, server 18*a* is notified so the corresponding data record may be deleted from the database or archived for other audit purposes.

The system of the present invention may be implemented with the components at deposit site 14 alone, the components located at processing site 24 alone or a combination of the components at the two sites. If the components at site 14 are used alone, the data repository generated by server 18*a* accompanies the film roll to site 24 and back. Upon return of the developed roll, server 18*a* updates the status of the corresponding data record and generates a notification message that is delivered by system 22 to the user. If the components at site 24 are used alone, a data repository and data record are generated upon receipt of a film roll at processing site 24. The repository is read upon shipment of the developed roll for updating the corresponding data record and generating notification messages that are delivered by system 22 at site 24 to the customer. This implementation requires the capture of customer data at a deposit site by known manual methods so the data may be entered at site 24 when the roll is received there. When servers are used at both sites, only one notification system 22 is required and preferably it is located at site 14. However, notification message systems may be located at both sites if distribution of the notification task is desired.

Figure 2A:
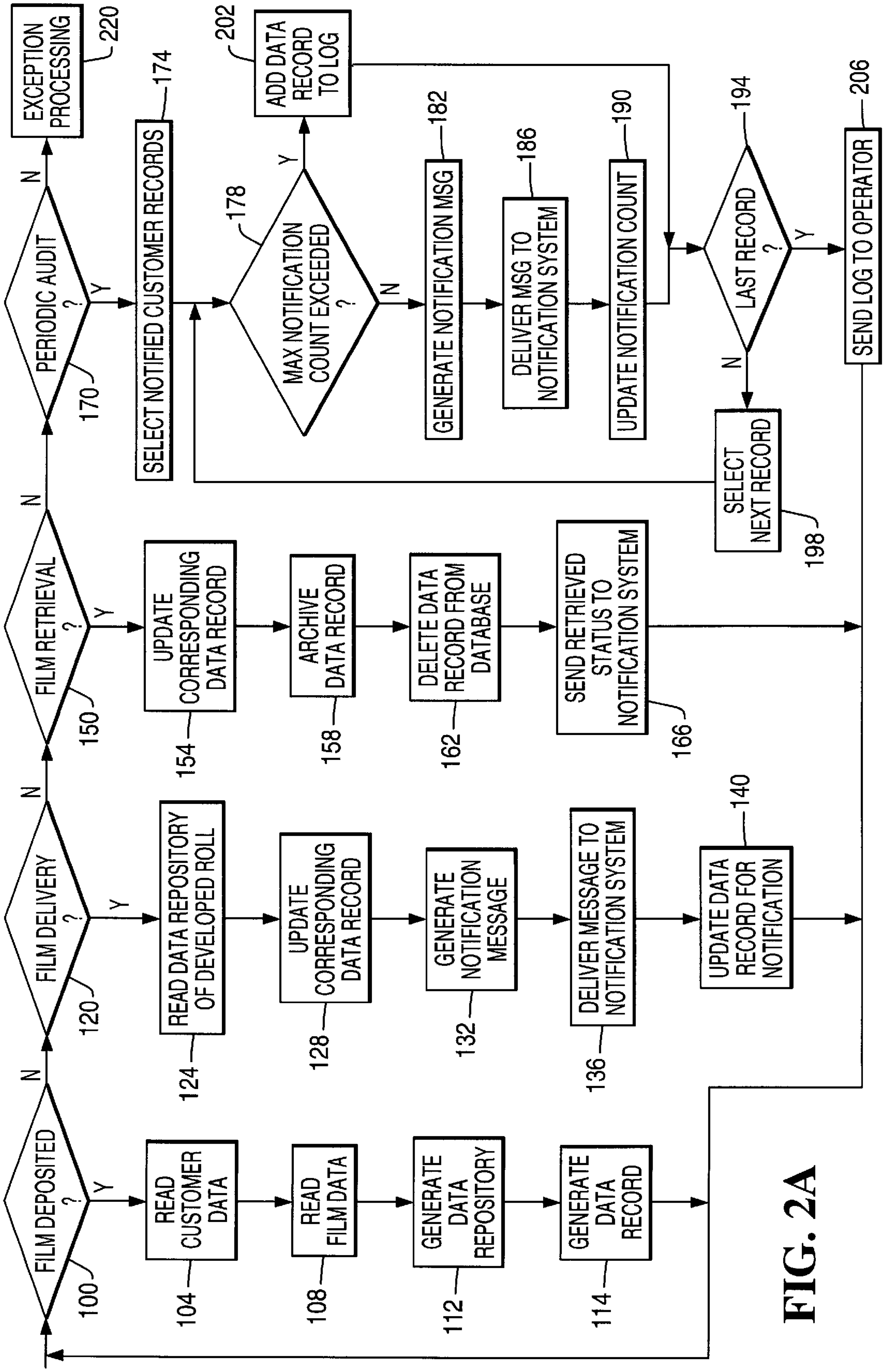
FIG. 2A is a flowchart of an exemplary method for generating customer notification messages regarding availability of developed film rolls for retrieval.

An exemplary method implemented by server 18*a* in accordance with the principles of the present invention is shown in FIG. 2A. The method begins by determining whether a customer has delivered a film roll for processing (Block 100), a developed film roll has been delivered from lab site 24 (Block 120), a customer has retrieved a developed film roll (Block 150), or it is time for a retrieval audit of database records (Block 170). Otherwise, an error has occurred and exception processing takes place (Block 220). In response to determining that data capture device 20*a* is providing data for film being deposited by a customer (Block 100), server 18*a* reads customer data (Block 104) and film roll data (Block 108) to generate a data repository to accompany the film roll (Block 112). A data record is also generated from these data and data corresponding to deposit site 14 (Block 114). The data record is preferably stored in a database coupled to server 18*a*. Server 18*a* continues to scan for data events.

In response to data capture device 20*a* providing data from a developed film roll delivered from a processing lab (Block 120), server 18*a* reads the data obtained by data capture device 20*a* from the data repository accompanying the developed film roll (Block 124). The delivery status of the film roll is updated in the corresponding data record of the database (Block 128). A customer notification message is generated (Block 132) and sent to notification system 22 for delivery to the customer identified by the corresponding database record (Block 136). The database record is updated to indicate a notification message has been sent to the customer (Block 140) and server 18*a* continues to scan for data events.

In response to being notified that a customer has retrieved a developed film roll (Block 150), server 18*a* updates the retrieval status of the corresponding database record (Block 154) and archives the record (Block 158). The database record is then deleted (Block 162) and notification system 22 is informed of the retrieval (Block 166). In response to this notification, an email system may remove the corresponding customer's email address from the address book of the email system. Similarly, a voice attendant system may delete the association of a voicemail box to a customer and a telemarketing system may delete the customer's number from its list of stored telephone numbers.

In response to a determination that a periodic audit of database records for developed film rolls that have not been retrieved should occur (Block 170), server 18_a_ selects the database records indicating customer notification has occurred without film roll retrieval (Block 174). For a record in the group of selected records, server 18_a_ determines whether the maximum number of customer notifications have already occurred (Block 178). If the maximum number of notifications has not occurred, another notification message is generated (Block 182) and delivered to notification system 22 (Block 186). The customer notification count in the database record is updated (Block 190). If any record indicates the maximum number of customer notifications has been exceeded (Block 178), the data content of the record is added to the log of film rolls not retrieved by notified customers (Block 202). After a database record from the group of selected records has been processed, server 18_a_ checks to determine whether additional audit records remain (Block 194). If there are remaining records to process, another record is selected (Block 198) and the process continues (Block 178). Otherwise, the log of developed film rolls that have not been retrieved by notified customers is sent to an operator (Block 206) and server 18_a_ continues to scan for data events.

Figure 3:
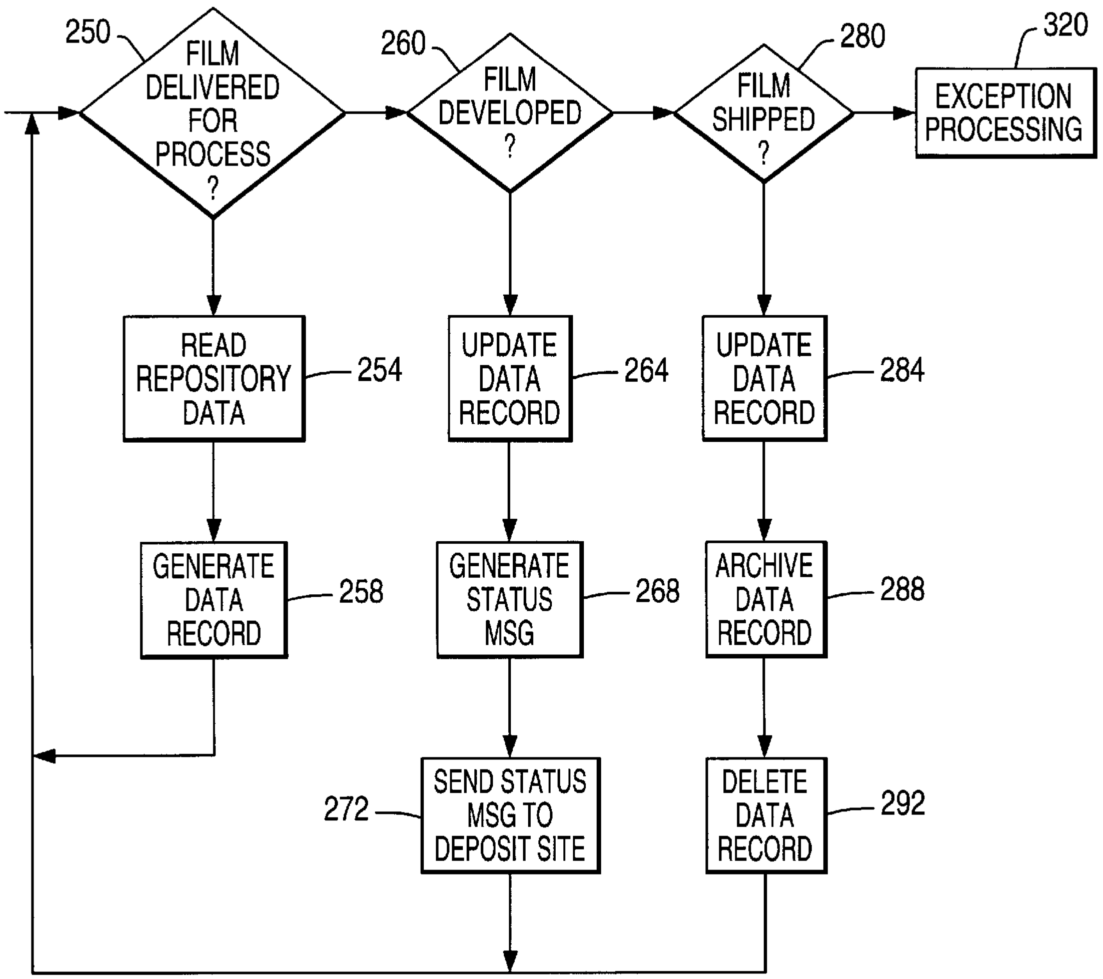
FIG. 3 is a flowchart of an exemplary method for generating and sending messages to a deposit site regarding the processing of a film roll at a processing lab.

An exemplary method implemented by server 18_b_ in accordance with the principles of the present invention is shown in FIG. 3. The method begins by determining whether a film roll has been delivered for processing (Block 250), a film roll has been developed (Block 260), or a developed film roll has been shipped to its corresponding deposit site (Block 280). Otherwise, an error has occurred and exception processing takes place (Block 320). In response to determining that data capture device 20_b_ is providing data for a film roll being delivered for processing (Block 250), server 18_a_ reads the data repository accompanying the film roll (Block 254) to generate a data record corresponding to the delivered film roll (Block 258). The data record is preferably stored in a database coupled to server 18_b_. A data repository to accompany the film roll during processing at lab site 24 may be generated by server 18_b_ if the data repository accompanying the delivered film roll is removed from the film roll after being read by data capture device 20_b_. Server 18_b_ continues to scan for data events.

Figure 2B:
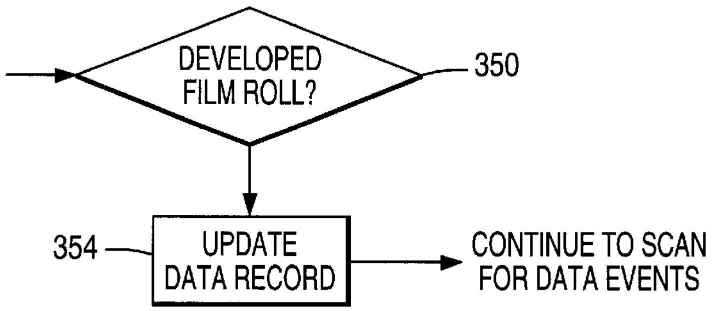
FIG. 2B is a flowchart of an exemplary method for processing status messages from a processing lab server regarding development of a film roll.

In response to data capture device 20_b_ providing data corresponding to a film roll developed at lab site 24 (Block 260), server 18_b_ updates the processed status in the corresponding data record (Block 264). A message notifying deposit site 14 of the developed status of the film roll may be generated (Block 268) and sent to server 18_a_ (Block 272). If server 18_b_ generates such a message, the data event processing shown in FIG. 2B is added to the server 18_a_ processing shown in FIG. 2A. In that scenario, server 18_a_ determines whether a developed film roll message has been received (Block 350, FIG. 2B) so the corresponding data record may be updated (Block 354, FIG. 2B). The developed film roll message is another data event for which server 18_a_ scans. After processing the notification that a film roll has been processed (Blocks 260–272, FIG. 3), server 18_a_ continues to scan for data events.

In response to being notified that a developed film roll has been shipped to its corresponding deposit site (Block 280), server 18_b_ updates the shipped status of the corresponding data record (Block 284) and archives the record (Block 288). The database record is then deleted (Block 292). As discussed above with respect to the sending of a message to server 18_a_ regarding development of a film roll, server 18_b_ may also generate and send messages to server 18_a_ regarding receipt of a film roll and/or shipment of a film roll. If server 18_b_ generates and sends such messages, they are processed by server 18_a_ in a manner similar to that indicated for the processing of developed film roll messages as shown in FIG. 2B.

While the present invention has been illustrated by the description of exemplary processes, and while the various processes have been described in considerable detail, it is not the intention of the applicant to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A system for generating and assigning bin identification numbers for storage bins for developed film rolls maintained at a deposit site comprising:

a data receiver for receiving customer identification data, film roll identification data, and deposit site identification data;

a bin identification number generator for generating and assigning a bin identification number using said customer identification data, said film roll identification data and said deposit site identification data; and a bin identification number mapper that compares said generated bin identification number to a list of reserved bin identification numbers to determine whether a generated bin identification number is assigned to a bin for storage of a customer's developed film roll.

2. The system of claim 1 wherein said mapper sends a regenerate signal to said number generator to generate another number in response to a generated number being contained in said list of reserved bin identification numbers.

3. The system of claim 1 wherein said mapper adds said generated number to said list of reserved bin identification numbers in response to said generated number not being contained in said list of reserved identification numbers.

4. The system of claim 2 wherein said bin identification number generator generates another bin identification number in response to receiving said regenerate signal from said mapper.

5. A method for generating and assigning bin identification numbers for storage bins for developed film rolls maintained at a deposit site comprising:

receiving customer identification data, film roll identification data, and deposit site identification data;

generating a bin identification number using said customer identification data, said film roll identification data and said deposit site identification data;

comparing said generated bin identification number to a list of reserved bin identification numbers to determine whether a generated bin identification number is assigned to a bin for storage of a customer's developed film roll; and assigning said generated bin identification number to the customer's developed film roll when said generated bin identification number is not in the list of reserved bin identification numbers.

6. The method of claim 5 further comprising:

sending a regenerate signal to said number generator to generate another number in response to a generated number being contained in said list of reserved bin identification numbers.

7. The method of claim 5 further comprising:

adding said generated number to said list of reserved bin identification numbers in response to said generated number not being contained in said list of reserved identification numbers.

8. The method of claim 6 further comprising:

generating another bin identification number in response to receiving said regenerate signal from said mapper.

9. A system for receiving film for developing from a customer and returning the developed film to the customer comprising:

a data receiver operable to receive customer identification data, film roll identification data, and deposit site identification data;

a bin identification number generator operable to generate a bin identification number from said customer identification data, said film roll identification data and said deposit site identification data;

a bin identification number mapper that compares said generated bin identification number to a list of reserved bin identification numbers to determine whether a generated bin identification number is currently assigned to a bin for storage of a customer's developed film roll;

a bin identification number assignor operable to assign the bin identification number to the customer's developed film roll when the bin identification number is not in the list of reserved bin identification numbers; and means for notifying the customer when the customer's developed film roll is returned to the assigned bin identification number from processing.

10. The system of claim 9, wherein said bin identification number mapper sends a regenerate signal to said number generator to generate another number in response to a generated number being contained in said list of reserved bin identification numbers.

11. The system of claim 9, wherein said bin identification number mapper adds said generated number to said list of reserved bin identification numbers in response to said generated number not being contained in said list of reserved identification numbers.

12. The system of claim 11, wherein said bin identification number generator generates another bin identification number in response to receiving said regenerate signal from said bin identification number mapper.

13. The system of claim 9, wherein said means for notifying includes one of e-mail notification, automated telephone notification, personal telephone notification, and postal mail notification.

* * * * *